United States Patent [19]
Chambers

[11] Patent Number: 5,930,715
[45] Date of Patent: Jul. 27, 1999

[54] METHOD OF LOCAL ROUTING AND TRANSCODER THEREFOR

[75] Inventor: David Chambers, Bath, United Kingdom

[73] Assignee: Motorola, Inc., Schaumburg, Ill.

[21] Appl. No.: 08/902,564

[22] Filed: Jul. 29, 1997

[30] Foreign Application Priority Data

Sep. 9, 1996 [GB] United Kingdom .................. 9616794

[51] Int. Cl.$^6$ .................................................. H04Q 7/20
[52] U.S. Cl. ........................................ 455/445; 455/422
[58] Field of Search .................................. 455/445, 449, 455/432, 422, 428, 403; 375/242, 377; 370/522, 345, 523, 329, 330; 379/220

[56] References Cited

U.S. PATENT DOCUMENTS

| | | | |
|---|---|---|---|
| 5,533,114 | 7/1996 | Ballard et al. ........................... | 379/220 |
| 5,734,699 | 3/1998 | Lu et al. .................................. | 455/422 |
| 5,734,979 | 3/1998 | Lu et al. .................................. | 455/428 |
| 5,761,195 | 6/1998 | Lu et al. .................................. | 455/445 |

FOREIGN PATENT DOCUMENTS

| | | |
|---|---|---|
| 2 063 018 | 5/1981 | United Kingdom . |
| 2 245 455 | 2/1992 | United Kingdom . |
| WO93/25025 | 12/1993 | WIPO . |

*Primary Examiner*—Dwayne D. Bost
*Assistant Examiner*—Raymond B. Persino
*Attorney, Agent, or Firm*—Heather L. Creps

[57] ABSTRACT

A transcoder of a communication system is arranged to selectively embed (104) a data pattern into a call (102) to produce a slow-rate data channel in the call emanating from a switch. The data pattern includes a call identity that uniquely identifies how the call is routed through the communication system. In the event that transcoder detects (106) this call identity during subsequent routing of the call back to the switch, the transcoder identifies that the call can be routed directly through the switch and therefore instructs (112) the communication system to execute a local routing operation in which control information is routed throughout the communication system while traffic information generated in the call is routed directly through the switch, as illustrated in FIG. 4.

8 Claims, 3 Drawing Sheets

METHOD OF LOCAL ROUTING AND TRANSCODER THEREFOR

BACKGROUND TO THE INVENTION

This invention relates, in general, to a method of routing a communication at a local level and its associated signalling scheme, and is particularly, but not exclusively, applicable to the routing of a communication within a cellular communicaton network.

SUMMARY OF THE PRIOR ART

The cost of obtaining interconnection between fixed site infrastructure of telecommunication systems is a factor that influences the ability to provide a viable, inexpensive telephony system. Indeed, rather than the cost of installing the infrastructure (which can be recouped steadily over the lifetime of the system) or the cost of a licence for the limited air-interface in a radio communication system, it is the recurring costs associated with hiring high-capacity, robust and high-quality links, such as satellite links and high data rate Megastreams, that effects service costs. This problem is becoming increasingly apparent in relation to cellular communication systems, such as the Global System for Mobile (GSM) communication, in which the percentage of mobile-to-mobile calls and mobile-to-fixed network calls within the same local (geographic) area is increasing with market penetration. In particular, leasing costs for such high-quality links can be excessive in systems where there is a large volume of low-tariff calls, such as within an in-building environment where calls could otherwise potentially be routed on a local basis rather than by routing a call between fixed base transceiver stations (BTSs) and fixed but physically separate base site controllers (BSCs).

In mobile communication systems, a double encoding process currently takes place. Specifically, a mobile unit will first encode speech for transmission to base station equipment over a radio frequency link, for example. Subsequently, the fixed infrastructure equipment will further encode the signals for transmission at the base station to ensure efficient and robust communication over an air-interface.

In relation to GSM, for example, a mobile unit encodes a speech communication at a rate of 16 kbit/s, which includes 13kbit/s of sampled speech and 3 kbit/s of ancillary information, such as parity check and correction bits (and the like) and synchronisation information. This 16 kbit/s speech is multiplexed into a time-slot containing three other speech calls to produce a channel of 64 kbit/s on a landline, and this channel is communicated by a base station controller (BSC) to at least one fixed base transceiver station (BTS). As will be understood, the BTS serves a cell that is typically partitioned into distinct sectors each administered by individual transceivers, while a BSC serves a group of cells. A transcoder (which provides a transposition in the coding scheme received by the BTS) de-multiplexes the channel and then encodes each speech communication as a 64 kbit/s pulse code modulated (PCM) format for transparent and sequential transmission through a first Mobile Switching Centre (MSC), a second MSC and then to a second transcoder for PCM decoding for onward routing to a BSC, BTS and ultimately, perhaps, to another subscriber unit.

With specific regard to the encoding operation of the GSM system (which is used solely for the purposes of explanation), a TRAU (Transcoder Rate Adaptation Unit) frame of information has a duration of 20 milliseconds (ms), while speech is sampled at a rate of 8000 samples per second. Therefore, bearing in mind that each sample is an 8-bit word, each TRAU frame consists of one-hundred and sixty 8-bit samples. Subsequently, transcoder operation codes these one-hundred and sixty samples as an 8-bit PCM word to provide 1280 bits of PCM information per frame (equivalent to 64 kbit/s). As will be understood, the structure of the 8-bit PCM frame is indicative of a signal level, with the Least Significant Bit (LSB) being of relatively little importance in the re-construction of encoded information when compared with the relative importance of successive bits. As such, the Most Significant Bit (MSB) has the greatest effect on the re-construction of encoded information, since its bit-value in an 8-bit binary word is indicative of a level one-hundred and twenty-eight times greater than the bit-value of the LSB.

RELATED PATENT APPLICATIONS

The present invention is related and complementary to the simultaneously filed, co-pending UK patent application (No.) entitled "TRANSCODER AND METHOD FOR A NON-TANDEM CODING OPERATION", which other application is also filed in the name of Motorola Limited and which is incorporated herein by reference. In this other co-pending application, non-tandem operation between transcoders of a communication network is achieved by identifying transcoder compatibility. Generally (but without specific limitation), the co-pending application discloses the concept that a first transcoder is arranged to initially double encode information by transcoding, for example, single encoded speech with pulse code modulation. Periodically, every consecutive word in a double encoded frame has its least significant bit substituted with sequential bits of a predetermined data pattern (indicative of transcoder compatibility) to produce an embedded slow-rate data channel. A second transcoder, arranged initially to receive double encoded frames, searches for the predetermined data pattern, and is arranged to re-configure itself to a vo-coder by-pass mode (i.e. non-tandem operation) if the predetermined data pattern is found. A feedback mechanism causes the first transcoder to adopt a vo-coder by-pass mode, whereby single encoded speech, for example, is routed directly through the first and second transcoders without the need of applying double encoding and its associated decoding.

SUMMARY OF THE INVENTION

According to a first aspect of the present invention there is provided a method of modifying the routing of a call between a first and a second communication unit of a communication system having a transcoder coupled to receive information from the first communication unit via a switch, the method comprising the steps of: a) producing an encoded signal by having the transcoder embed into the information a call identity identifying how the call is routed through the communication system; b) communicating the encoded signal into the communication system; c) at the transcoder, receiving a signal from the communication system and attempting to detect the call identity in the signal; and d) in the event that the call identity is detected, causing the call to be routed to the second communication unit only via the switch that has been thus identified as serving both the first and second communication units. Typically the call comprises traffic channel information and associated control channel information, but only traffic channel information is routed directly via the switch to the second communication unit in step d).

In a second aspect of the present invention there is provided a transcoder coupled to receive information via a switch from a first communication unit of a communication system arranged to route a call between the first communication unit and a second communication unit, the transcoder unit comprising: a) means for producing an encoded signal by embedding a call identity identifying how the call is routed through the communication system; b) means for communicating the encoded signal into the communication system; c) means for receiving a signal from the communication system and for attempting to detect the call identity in the signal; and d) means, responsive to the detection of the call identity, for causing the call to be routed to the second communication unit only via the switch thus identified as serving both the first and second communication units.

In a preferred embodiment, the transcoder further comprises: memory for storing a predetermined bit sequence; and means for modifying control information for the call to include the predetermined bit sequence that indicates that the call between the first and second communication units has been routed only via the switch. The transcoder further includes means for detecting the predetermined bit sequence in the signal received; and means for reverting the routing of the call through the communication system in the event that the predetermined bit sequence is undetected.

The present invention significantly reduces the recurring costs of interconnection between BTS and BSC sites by locally routing the call traffic within the BTS site, both for mobile-to-mobile calls and mobile-to-fixed network (subscriber) calls.

An exemplary embodiment of the present invention will now be described with reference to the accompanying drawings.

DETAILED DESCRIPTION OF A PREFERRED EMBODIMENT

Figure 1:
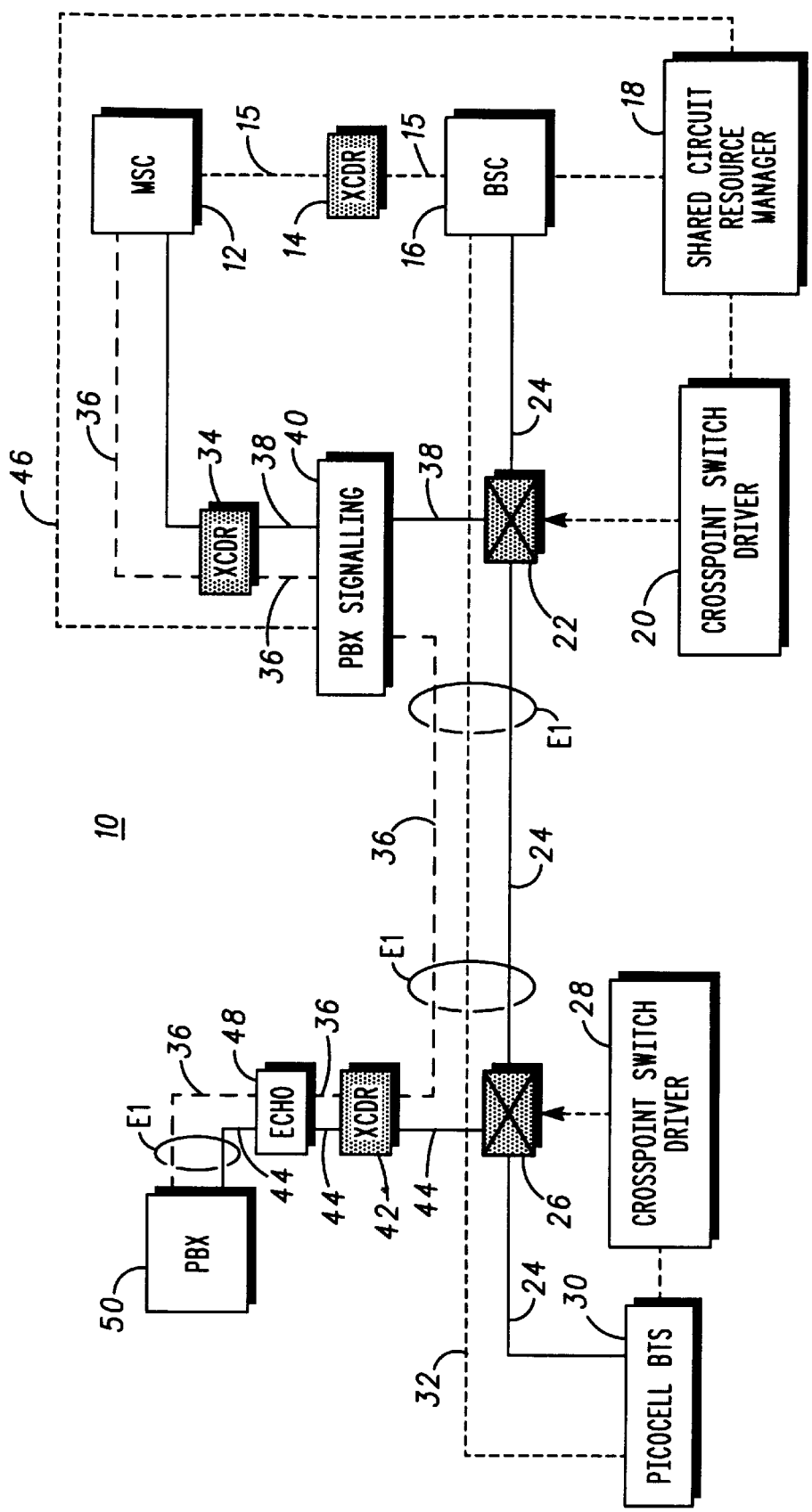
FIG. 1 is a block diagram of a communication system according to a preferred embodiment of the present invention.

Referring to FIG. 1 in which there is shown a block diagram of a communication system 10 according to a preferred embodiment of the present invention. A cellular portion of the communication system 10 can be considered to include a MSC 12 coupled via a first transcoder 14 (and through a communication resource 15 capable of supporting both traffic channel and control channel information) to a BSC 16. The BSC 16 is coupled to a shared circuit resource manager 18 which controls the operation of a first cross-point switch driver 20 (or the like), which in turn operates a first switch 22 that couples a traffic channel resource 24 to the BSC 16. The first switch 22 is also coupled via the traffic channel resource 24 to a second switch 26 that operates under the control of a second cross-point switch driver 28 that in turn is coupled to a BTS 30. The BTS 30, which may be a picocellular BTS, is also coupled via the traffic channel resource 24 to the second switch 26 and hence to the BSC 16 and MSC 12. The term traffic channel resource is used to describe, generally, a multitude of traffic channels having associated header information bits. The BSC 16 is additionally coupled to the BTS 30 by a control channel resource 32 that is used to regulate information flow over the traffic channel resource and for general system control, as will be understood.

Generally, in relation to FIG. 1 only (and as will be appreciated), dotted interconnections represent dedicated control (signalling) channel resources, while solid interconnections are indicative of traffic channel resources and dashed interconnections support both control and traffic channel resources. Furthermore, the shared channel resource manager 18 will be implemented, typically, as a software function in a BSC, although it has been shown as a functionally distinct block in FIG. 1. Similarly, the cross-point switch drivers may be co-located within either a BSC, a BTS or a switch.

With respect to an interconnected landline portion of communication system 10, the MSC 12 is coupled via a second transcoder 34 (and through both a communication resource 36 capable of supporting both traffic channel and control channel information and a traffic channel resource 38) to a Private Branch Exchange (PBX) controller 40. The PBX 40 is coupled to the first switch 22 via a traffic channel resource 38, or to a third transcoder 42 via the communication resource 36. The third transcoder 42 is further connected to the second switch 26 via another traffic channel resource 44. The PBX 40 (which administers the control of PBX signalling within a local landline system and which therefore performs a function analogous to that of BSC 16) is also coupled via a control channel resource 46 to the shared circuit resource manager 18. The third transcoder 42 is coupled to an echo cancellor 48 via the traffic channel resource 44 and the communication resource 36, while a PBX 50 is connected to the traffic channel resource 44 and the communication resource 36.

Generally, as will be appreciated, the interconnections between, on the one hand, the second switch 26, the BTS 30 and the third transcoder 42 and, on the other hand, the first switch 22, the BSC 16 and the PBX 40 can be achieved over a common link, such as provided by a dedicated E1 link (or the like).

To implement the present invention in which a call is locally routed whenever possible, two distinct operating phases are required, namely: (i) identification of which calls can be locally routed; and (ii) implementation of local traffic routing.

The mechanism used to identify when to apply local routing is based on a technique in which a transcoder embeds a data pattern (that contains a unique call identity) into, typically, every consecutive word of a selected double-encoded frame. Typically, the data pattern is embedded in an uplink by altering at least one bit of some words in the selected frame to replicate (over time) the data pattern as an embedded slow-rate data channel. It is therefore usual that the bits selected for alteration in the word are of relatively minor importance (significance) in relation to the reproduction of any information relayed in the word.

In the event that the transcoder embedding the data pattern in the uplink also receives in a downlink the same data pattern (and hence the unique call identity), the system realises that local routing is possible. Alternatively, the communication system contains sufficient intelligence to relate a particular transcoder in an uplink from a BTS of a cellular communication system with a different transcoder coupled to a PBX that is served by a switch commonly shared between the BTS and the PBX. In both instances, the switch 26 coupled to the BTS can be instructed by the cross-point switch driver (in response to the shared circuit resource manager) to route calls locally and thereby eliminate the requirement to send traffic channel information between, principally, the second switch 26 (or the third transcoder 42) and the first switch 22 (or the PBX 40). However, control information must still be communicated between these otherwise isolated circuits to maintain proper system operation and to ensure that the local routing mechanism can be terminated if a need arises. Specifically, signalling for call set-up, tear-down and supplementary services must be routed directly (and transparently) between the MSC 12 and either the fixed network (i.e. PBX 50) or BTS 30. Once a circuit has been identified for local routing, the traffic (e.g. speech or data communications) can be routed directly between channel coders within a BTS (for mobile to mobile calls) or between a BTS and an external fixed network.

As will be understood, when local routing has been activated by the selective closure of the first and second switches (22 and 26, respectively), header information in a locally routed traffic channel is sufficient to allow the system to locally route a call, and therefore the necessity for an additional dedicated control channel (at a local level) may be dispensed with.

Figure 2:
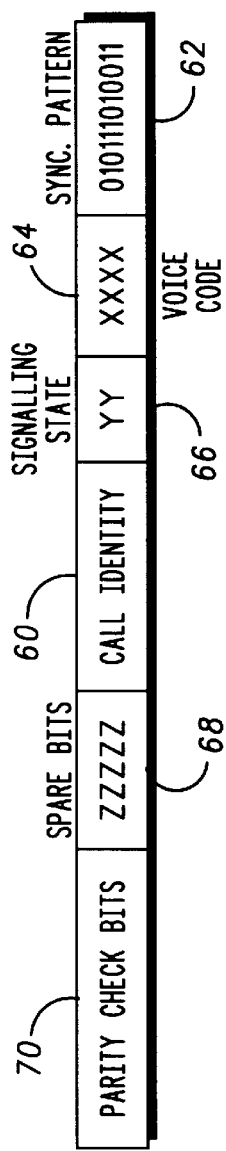
FIG. 2 illustrates an exemplary format for an embedded data pattern used as a communication protocol in the communication system of FIG. 1.

Turning now to FIG. 2 which illustrates an exemplary format for an embedded data pattern used as a communication protocol in the communication system of FIG. 1. If we consider, for exemplary purposes, that a frame of information generated by a transcoder contains one-hundred and sixty 8-bit samples, then the embedded data pattern should ideally contain no more than one-hundred and sixty bits (and probably many less than this). Typically, each of the bits in the data pattern is, preferably, sequentially substituted for respective bits of each 8-bit sample of a selected frame to modify its information content and to produce the slow-rate embedded data channel. The data pattern contains the unique call identify 60, which unique call identity is typically preceded by a synchronisation pattern 62, voice coding data bits 64 and signalling state bits 66. Additionally, the data pattern will contain spare bits 68 that may be used as an addressee field for the transcoder originating the information transfer and parity check bits 70 for error detection and correction purposes.

The call identity 60 could be compiled from the combination of an MSC number, a BSS number and an air-interface or fixed line circuit number.

The voice coding data bits 64 identify a frame type (such as frame having either a GSM frame format, a GSM extended frame format, or a half-rate or a full-rate format) and may contain four or more bits to allow sufficient scope for defining frame types likely to be encountered. The signalling state bits 66 represent an additional indication of transcoder intention, and may be used to identify that the encoding scheme is either double encoded PCM, is speech 16 kbit/s speech encoded or is about to change between these two extremes. As such 2-bits of information would be sufficient, with values accordingly assigned from logical 00 to logical 11. In terms of the predetermined data pattern, a technique such as HDLC (High-speed Data Link Control line) framing may be used where maximum protection is required.

With specific regard to implementation of the present invention in a GSM environment, the method used to identify when to implement a local routing scheme is based on sending the data pattern in-band on the least significant bits of a selected frame of the 64 kbit/s voice circuits that are communicated to the MSC. The in-band (embedded data channel) will be ostensibly undetectable to normal voice calls that are initially active and are not subject presently subject to local routing. In cases where a transcoder subsequently identifies the call identity in the data pattern as being the call identity that it originally encoded, the transcoder applies a predetermined bit sequence to a selected number (say, four) of the most significant bits of the 64 kbit/s voice circuits to indicate that local routing is active and to set up the local routing mode within other interconnected and associated equipment in the system.

Figure 3:
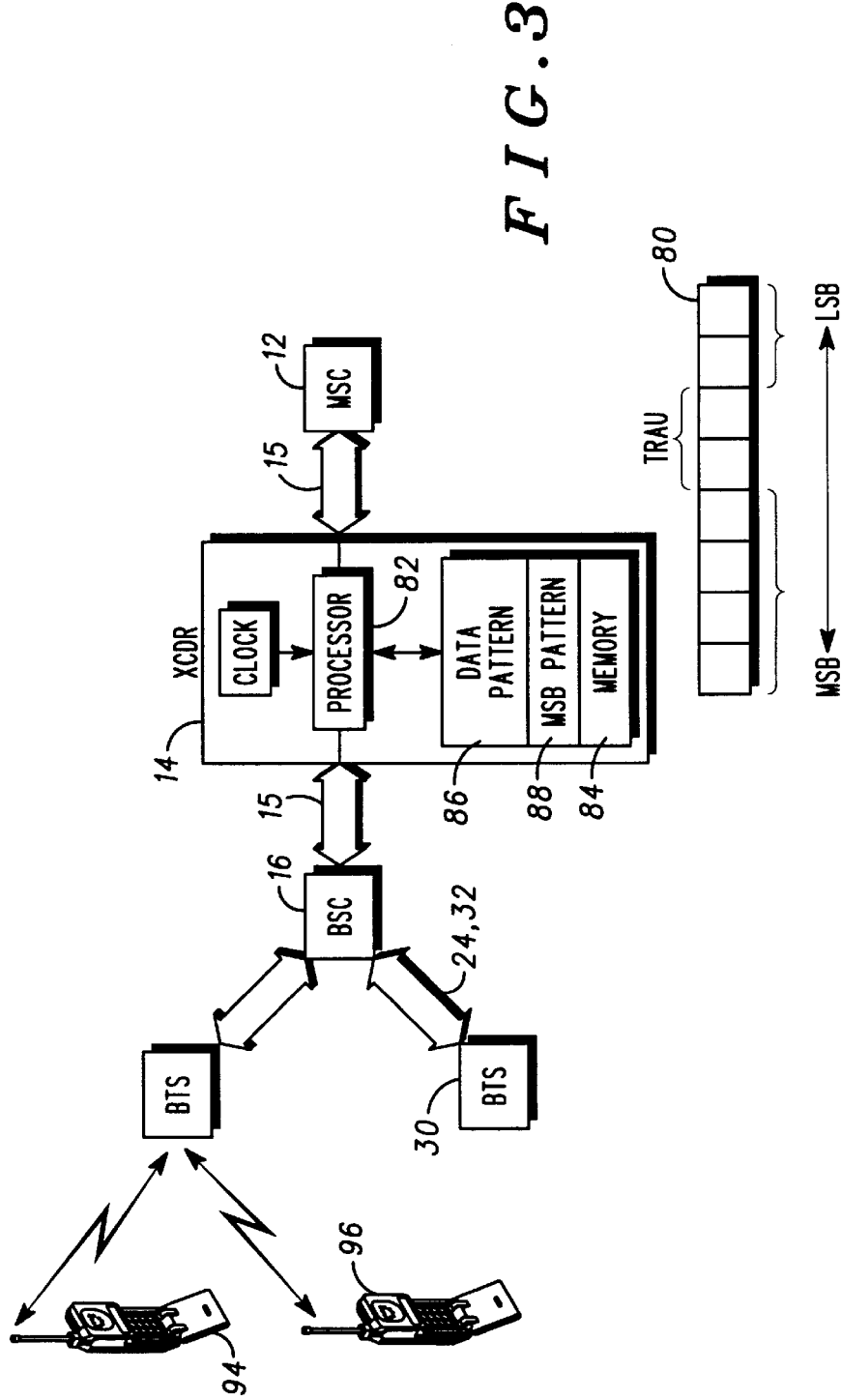
FIG. 3 is a flow diagram illustrating local routing according to a preferred embodiment of the present invention.

FIG. 3 shows, in some respects, a more detailed block diagram of the communication system of FIG. 1, including an indication of a preferred TRAU frame communication protocol 80 emanating from a transcoder XCDR. As can be seen, the transcoder contains a processor 82 that is coupled to memory 84 containing information 86 associated with the data pattern and the predetermined bit sequence 88. The processor 82, in response to entering the local routing mode, encodes its PCM output with the predetermined bit sequence. The processor 82 is also arranged to orchestrate recovery of any encoded data pattern that is receives. The transcoder XCDR continues transmitting the predetermined bit sequence on the four MSBs to the MSC, whereupon the MSC routes this predetermined bit sequence onward within the communication system. As such, a circuit in the transcoder that is actively participating in a locally routed call should continue to receive the predetermined bit sequence, but in the event that this circuit ceases to receive the predetermined bit sequence (because the MSC has changed the call routing or has terminated the call) the transcoder will identify the change in status (condition) in the circuit and will notify the BTS to revert to normal routing of the call. This structure therefore ensures that the communication system quickly reverts to normal routing operation, although slight tuning of timing parameters for handling the termination of local routing may be necessary in order to avoid irrelevant processing during call clear-down.

It will be understood and appreciated that some processing of the TRAU frames is required because the uplink and downlink framing is not identical, and the transcoder is normally flow controlled by the BTS channel coding process. Specifically, the 3 kbit/s ancillary (or header) information is adapted to ensure that up-link and down-link communications are appropriately structured to guarantee proper routing and recognition. Additionally, a preferred embodiment of the present invention contemplates the use of the channel coding process to implement flow control function normally dealt with by transcoders of the cellular or fixed networks, i.e. the synchronisation of the TRAU frame generation process is usually controlled by the channel coder and implemented in the transcoder. The channel coder must now be able to perform both function and so is adapted accordingly, and transcoders within the cellular and fixed site portions of the system therefore need to be in controlled communication, as will be understood.

Figure 4:
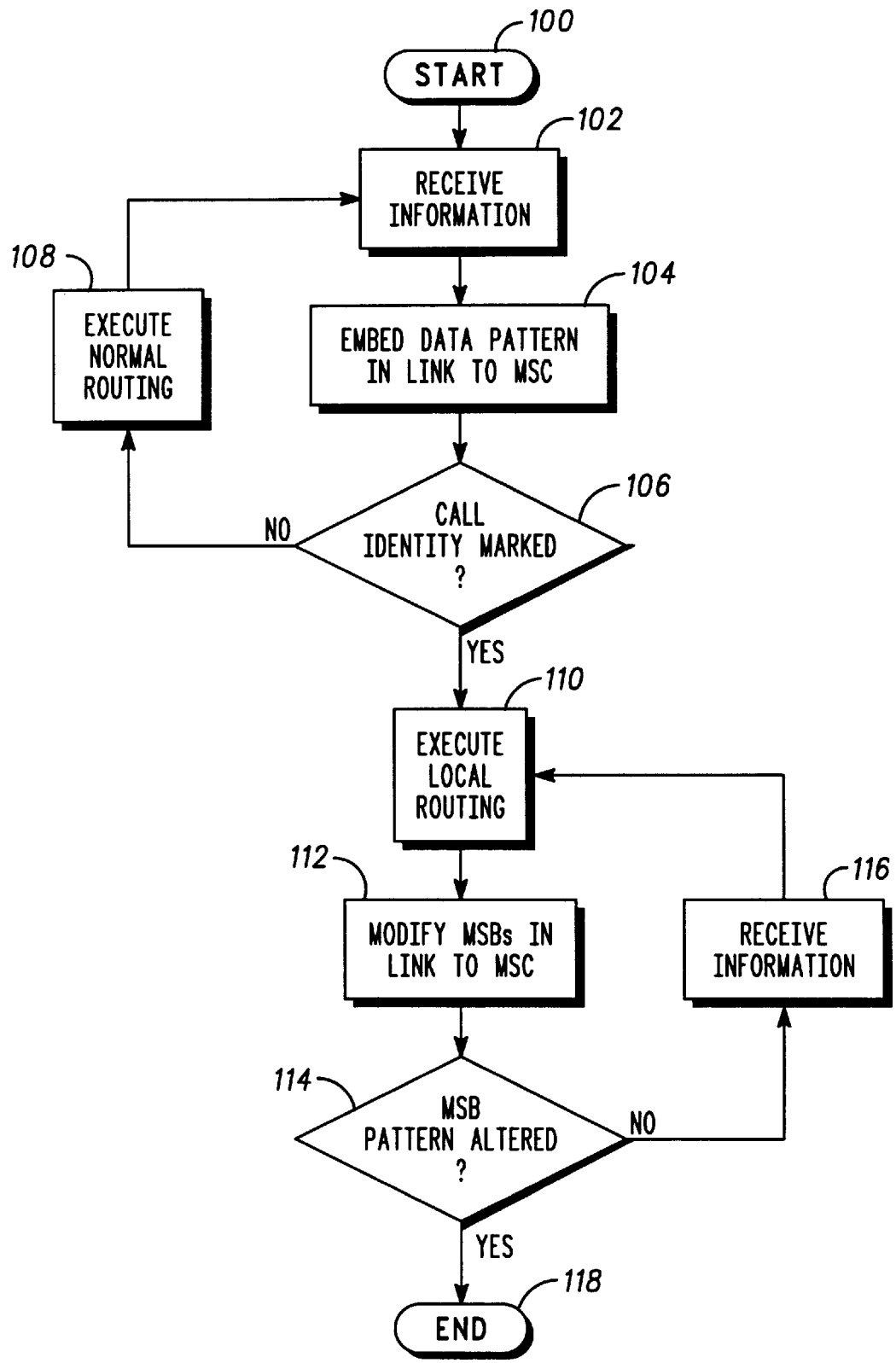
FIG. 4 is a more detailed block diagram of the communication system of FIG. 1, including an indication of a preferred communication protocol emanating from a transcoder.

FIG. 4 is a flow diagram illustrating local routing according to a preferred embodiment of the present invention. The process begin a block 100. At block 102 a transcoder receives information, and then embeds (at 104) the data pattern into PCM encoded data, for example. The data pattern can be embedded every frame at the expense of signal quality, or periodically if some delay in the establishment of local routing is acceptable. The transcoder then determines 106 whether the unique call identity embedded in the data pattern in up-link is returned in the downlink. If the unique call identity is missing, then normal routing 108 of the communication is required, and the process returns to block 102. In the event that the same unique call identity is received by the transcoder in the downlink, local routing is executed at 110. In this operating mode, the transcoder provides a control signal to the MSC by placing the predetermined bit sequence (block 112) on a control channel resource. Provided that the transcoder does not notify the BTS of local routing release 114, local routing continues 116, else the local routing ends 118 and the system returns to normal operation at block 100.

It will be appreciated that the embedding of the call identity is complementary to the embedding of information envisaged in the aforementioned co-pending UK patent application entitled "TRANSCODER AND METHOD FOR A NON-TANDEM CODING OPERATION", and that words within a selected frame not previously required to embed information could be modified to extend the embedded data channel to contain an indication of both non-tandem and local routing capabilities. Alternatively, an alternative bit in each word of a selected frame could be used.

Although the communication system 10 of FIG. 1 is shown to comprise a cellular radio communication portion and an interconnected landline portion, it will however be appreciated that the present invention may be implemented within a purely cellular system where there is no interconnection to a PBX. In this case, mobile units 94 and 96 are served by a single BTS, as shown in FIG. 3.

The present invention therefore advantageously provides a mechanism for locally routing a call through a serving BTS, which mechanism is easily implemented and which does not require significant modification of existing infrastructure. As will be appreciated, the present invention therefore improves overall system capacity and efficiency by avoiding having to transmit traffic channel information to circuits external to a local call, i.e. BTS to BSC and BSC to MSC traffic channel resources are released for use in other non-local communications.

It will, of course, be appreciated that the above description has been given by way of example only, and that modifications in detail, such as the application of the general principal to data communication and particularly in the event that the communication resource between transcoders (MSCs) is both of sufficiently high quality and is sufficiently robust, may be made within the scope of the present invention. Furthermore, although the detailed description of a preferred embodiment specifically refers to the substitution of the least significant bits (LSBs) of a periodic frame, it will be understood that the bit that is actually substituted need only have relatively minor significance in the overall re-construction of the word and that, therefore, other low order bits (e.g. the next lowest order bit that is also fairly insignificant in relation to an 8-bit (256 level) word) may also be used for the purpose of embedding the predetermined data sequence. In this respect, the significance of a particular bit in relation to a particular word is dependent upon the length and structure of the word in question (which length and structure is determined by the particular application), and that it is therefore only important to select a bit that is of sufficiently minor importance so as not to corrupt significantly the information relayed in the original word. Additionally, as will be appreciated, although the transcoders of FIG. 1 are shown located between the MSC and BSC (and, indeed, are usually proximinal to the MSC in many systems), the present invention is not limited to this structure and therefore contemplates the positioning of the transcoders in other locations within the illustrated infrastructure, particularly in a position between the BTS and BSC.

I claim:

1. A method of modifying the routing of a call between a first and a second communication unit of a communication system having a transcoder coupled to receive information from the first communication unit via a switch, the method comprising the steps of:

a) producing an encoded signal by having the transcoder embed into the information a call identity identifying how the call is routed through the communication system;

b) communicating the encoded signal into the communication system;

c) at the transcoder, receiving a signal from the communication system and attempting to detect the call identity in the signal; and d) in the event that the call identity is detected, causing the call to be routed to the second communication unit only via a switch serving both the first and second communication units.

2. The method of claim 1, further comprising the step of:

at the transcoder, modifying control information for the call to include a predetermined bit sequence that indicates that the call between the first and second communication units has been routed only via the switch.

3. The method of claim 2, further comprising the step of:

at the transcoder, attempting to detect the predetermined bit sequence; and reverting the routing of the call through the communication system in the event that the predetermined bit sequence is undetected.

4. The method of claim 1, 2 or 3, wherein the call comprises traffic channel information and associated control channel information, and wherein only traffic channel information is routed directly via the switch to the second communication unit in step d).

5. A transcoder coupled to receive information via a switch from a first communication unit of a communication system arranged to route a call between the first communication unit and a second communication unit, the transcoder unit comprising:

a) means for producing an encoded signal by embedding a call identity identifying how the call is routed through the communication system;

b) means for communicating the encoded signal into the communication system;

c) means for receiving a signal from the communication system and for attempting to detect the call identity in the signal; and d) means, responsive to the detection of the call identity, for causing the call to be routed to the second communication unit only via a switch serving both the first and second communication units.

6. The transcoder of claim 5, further comprising:

memory for storing a predetermined bit sequence; and means for modifying control information for the call to include the predetermined bit sequence that indicates that the call between the first and second communication units has been routed only via the switch.

7. The transcoder of claim 6, further comprising:

means for detecting the predetermined bit sequence in the signal received; and means for reverting the routing of the call through the communication system in the event that the predetermined bit sequence is undetected.

8. The transcoder of claim 5, 6 or 7, wherein the call identity is compiled from compiled from a combination of an MSC number, a BSS number and one of an air-interface or fixed line circuit number.

\* \* \* \* \*